US007606988B2

(12) United States Patent
Gower et al.

(10) Patent No.: US 7,606,988 B2
(45) Date of Patent: Oct. 20, 2009

(54) SYSTEMS AND METHODS FOR PROVIDING A DYNAMIC MEMORY BANK PAGE POLICY

(75) Inventors: Kevin C. Gower, Lagrangeville, NY (US); Dustin J. VanStee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 11/668,093

(22) Filed: Jan. 29, 2007

(65) Prior Publication Data

US 2008/0183977 A1 Jul. 31, 2008

(51) Int. Cl.
G06F 12/00 (2006.01)
(52) U.S. Cl. .............................. 711/154; 711/4; 711/105
(58) Field of Classification Search ........................ None
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt | |
| 3,825,904 A | 7/1974 | Burk et al. | 340/172.5 |
| 4,028,675 A | 6/1977 | Frankenberg | 711/106 |
| 4,135,240 A | 1/1979 | Ritchie | |
| 4,150,428 A | 4/1979 | Inrig et al. | |
| 4,472,780 A | 9/1984 | Chenoweth et al. | |
| 4,475,194 A | 10/1984 | LaVallee et al. | 371/10 |
| 4,486,739 A | 12/1984 | Franaszek et al. | 340/347 |
| 4,641,263 A | 2/1987 | Perlman et al. | |
| 4,654,857 A | 3/1987 | Samson et al. | |
| 4,723,120 A | 2/1988 | Petty, Jr. | 340/825.02 |
| 4,740,916 A | 4/1988 | Martin | 364/900 |
| 4,796,231 A | 1/1989 | Pinkham | 365/189.05 |
| 4,803,485 A | 2/1989 | Rypinski | 370/452 |
| 4,833,605 A | 5/1989 | Terada et al. | 364/200 |
| 4,839,534 A | 6/1989 | Clasen | 307/269 |
| 4,943,984 A | 7/1990 | Pechanek et al. | 375/109 |
| 4,985,828 A | 1/1991 | Shimizu et al. | 364/200 |

(Continued)

FOREIGN PATENT DOCUMENTS

EP 0229316 A2 7/1987

(Continued)

OTHER PUBLICATIONS

U.S. Appl. No. 11/419,586, filed May 22, 2006. Robert B. Tremaine. "Systems and Methods for Providing Remote Pre-Fetch Buffers".

(Continued)

*Primary Examiner*—Jack A Lane
(74) *Attorney, Agent, or Firm*—Cantor Colburn LLP

(57) ABSTRACT

Systems and methods for providing a dynamic memory buffer bank policy. Embodiments include a hub device for selecting a bank page policy. The hub device includes an input command stream interface and a bank page policy module. The input command stream interface detects commands from a memory controller that are directed to one or more memory devices that are connected to the hub device. The bank page policy module independently analyzes the commands to determine access patterns to the memory devices and for dynamically selecting between an open bank page policy and a closed bank page policy for the memory devices based on the analysis.

31 Claims, 10 Drawing Sheets

U.S. PATENT DOCUMENTS

| | | | |
|---|---|---|---|
| 5,053,947 A | 10/1991 | Heibel et al. | 364/200 |
| 5,177,375 A | 1/1993 | Ogawa et al. | |
| 5,206,946 A | 4/1993 | Brunk | 710/2 |
| 5,214,747 A | 5/1993 | Cok | 395/27 |
| 5,265,049 A | 11/1993 | Takasugi | |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,454,091 A | 9/1995 | Sites et al. | 395/413 |
| 5,475,690 A | 12/1995 | Burns et al. | 370/105.3 |
| 5,513,135 A | 4/1996 | Dell et al. | |
| 5,517,626 A | 5/1996 | Archer et al. | |
| 5,522,064 A | 5/1996 | Aldereguia et al. | |
| 5,544,309 A | 8/1996 | Chang et al. | |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,594,925 A | 1/1997 | Harder et al. | |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A | 8/1997 | Rondeau, II et al. | 365/63 |
| 5,666,480 A | 9/1997 | Leung et al. | 395/180 |
| 5,684,418 A | 11/1997 | Yanagiuchi | |
| 5,706,346 A | 1/1998 | Katta et al. | |
| 5,737,589 A | 4/1998 | Doi et al. | |
| 5,754,804 A | 5/1998 | Cheselka et al. | |
| 5,764,155 A | 6/1998 | Kertesz et al. | 340/825.08 |
| 5,822,749 A | 10/1998 | Agarwal | 707/2 |
| 5,852,617 A | 12/1998 | Mote, Jr. | 714/726 |
| 5,870,320 A | 2/1999 | Volkonsky | |
| 5,870,325 A | 2/1999 | Nielsen et al. | 365/63 |
| 5,872,996 A | 2/1999 | Barth et al. | 395/853 |
| 5,881,154 A | 3/1999 | Nohara et al. | |
| 5,917,760 A | 6/1999 | Millar | |
| 5,917,780 A | 6/1999 | Berestov | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,959,914 A | 9/1999 | Gates et al. | |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 6,003,121 A | 12/1999 | Wirt | |
| 6,011,732 A | 1/2000 | Harrison et al. | |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | 712/230 |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,170,047 B1 | 1/2001 | Dye | 711/170 |
| 6,170,059 B1 | 1/2001 | Pruett et al. | 713/200 |
| 6,173,382 B1 | 1/2001 | Dell et al. | |
| 6,185,718 B1 | 2/2001 | Dell et al. | |
| 6,198,304 B1 | 3/2001 | Sasaki | |
| 6,215,686 B1 | 4/2001 | Deneroff et al. | 365/52 |
| 6,219,288 B1 | 4/2001 | Braceras et al. | |
| 6,219,760 B1 | 4/2001 | McMinn | |
| 6,233,639 B1 | 5/2001 | Dell et al. | |
| 6,260,127 B1 | 7/2001 | Olarig et al. | 711/167 |
| 6,262,493 B1 | 7/2001 | Garnett | |
| 6,285,172 B1 | 9/2001 | Torbey | |
| 6,292,903 B1 | 9/2001 | Coteus et al. | 713/401 |
| 6,301,636 B1 | 10/2001 | Schultz et al. | 711/108 |
| 6,308,247 B1 | 10/2001 | Ackerman et al. | |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,349,390 B1 | 2/2002 | Dell et al. | |
| 6,357,018 B1 | 3/2002 | Stuewe et al. | |
| 6,370,631 B1 | 4/2002 | Dye | 711/170 |
| 6,378,018 B1 | 4/2002 | Tsern et al. | 710/129 |
| 6,381,685 B2 | 4/2002 | Dell et al. | |
| 6,393,512 B1 | 5/2002 | Chen et al. | |
| 6,393,528 B1 | 5/2002 | Arimilli et al. | 711/137 |
| 6,408,398 B1 | 6/2002 | Freker et al. | |
| 6,425,044 B1 | 7/2002 | Jeddeloh | |
| 6,446,174 B1 | 9/2002 | Dow | |
| 6,461,013 B1 | 10/2002 | Simon | |
| 6,467,013 B1 | 10/2002 | Nizar | |
| 6,473,836 B1 | 10/2002 | Ikeda | 711/137 |
| 6,477,614 B1 | 11/2002 | Leddige et al. | |
| 6,477,615 B1 | 11/2002 | Tanaka | |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Widmer | 375/242 |
| 6,496,910 B1 | 12/2002 | Baentsch et al. | 711/165 |
| 6,499,070 B1 | 12/2002 | Whetsel | |
| 6,502,161 B1 | 12/2002 | Perego et al. | 711/5 |
| 6,507,888 B2 | 1/2003 | Wu et al. | 711/105 |
| 6,510,100 B2 | 1/2003 | Grundon et al. | |
| 6,513,091 B1 | 1/2003 | Blackmon et al. | 710/316 |
| 6,526,469 B1 | 2/2003 | Drehmel et al. | |
| 6,530,007 B2 | 3/2003 | Olarig | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | 713/322 |
| 6,584,576 B1 | 6/2003 | Co | |
| 6,587,912 B2 | 7/2003 | Leddige et al. | |
| 6,590,827 B2 | 7/2003 | Chang et al. | |
| 6,594,748 B1 | 7/2003 | Lin | |
| 6,601,121 B2 | 7/2003 | Singh et al. | 710/112 |
| 6,601,149 B1 | 7/2003 | Brock et al. | |
| 6,604,180 B2 | 8/2003 | Jeddeloh | |
| 6,611,902 B2 | 8/2003 | Kuroda et al. | 711/167 |
| 6,611,905 B1 | 8/2003 | Grundon et al. | |
| 6,594,713 B1 | 9/2003 | Fuoco et al. | |
| 6,622,217 B2 | 9/2003 | Gharachorloo et al. | 711/141 |
| 6,622,227 B2 | 9/2003 | Zumkehr et al. | |
| 6,625,687 B1 | 9/2003 | Halber et al. | 711/105 |
| 6,625,702 B2 | 9/2003 | Rentschler et al. | |
| 6,628,538 B2 | 9/2003 | Funaba et al. | 365/63 |
| 6,631,439 B2 | 10/2003 | Saulsbury et al. | |
| 6,636,957 B2 * | 10/2003 | Stevens et al. | 711/171 |
| 6,643,745 B1 | 11/2003 | Palanca et al. | |
| 6,671,376 B1 | 12/2003 | Koto et al. | 380/210 |
| 6,678,811 B2 | 1/2004 | Rentschler et al. | 711/167 |
| 6,681,292 B2 | 1/2004 | Creta et al. | |
| 6,684,320 B2 | 1/2004 | Mohamed et al. | |
| 6,697,919 B2 | 2/2004 | Gharachorloo et al. | 711/141 |
| 6,704,842 B1 | 3/2004 | Janakiraman et al. | |
| 6,721,185 B2 | 4/2004 | Dong et al. | |
| 6,721,944 B2 | 4/2004 | Chaudhry et al. | |
| 6,738,836 B1 | 5/2004 | Kessler et al. | |
| 6,741,096 B2 | 5/2004 | Moss | |
| 6,748,518 B1 | 6/2004 | Guthrie et al. | |
| 6,754,762 B1 | 6/2004 | Curley | |
| 6,766,389 B2 | 7/2004 | Hayter et al. | |
| 6,775,747 B2 | 8/2004 | Venkatraman | |

| | | |
|---|---|---|
| 6,791,555 B1 | 9/2004 | Radke et al. |
| 6,792,495 B1 | 9/2004 | Garney et al. |
| 6,799,241 B2 * | 9/2004 | Kahn et al. ............... 711/105 |
| 6,839,393 B1 | 1/2005 | Sidiropoulos ............... 375/371 |
| 6,847,583 B2 | 1/2005 | Janzen et al. |
| 6,851,036 B1 | 2/2005 | Toda et al. |
| 6,874,102 B2 | 3/2005 | Doody et al. |
| 6,877,076 B1 | 4/2005 | Cho et al. |
| 6,877,078 B2 | 4/2005 | Fujiwara et al. |
| 6,882,082 B2 | 4/2005 | Greeff et al. |
| 6,889,284 B1 | 5/2005 | Nizar et al. |
| 6,898,726 B1 | 5/2005 | Lee |
| 6,910,146 B2 | 6/2005 | Dow |
| 6,918,068 B2 | 7/2005 | Vail et al. |
| 6,925,534 B2 | 8/2005 | David |
| 6,938,119 B2 | 8/2005 | Kohn et al. |
| 6,944,084 B2 | 9/2005 | Wilcox |
| 6,948,091 B2 | 9/2005 | Bartels et al. |
| 6,949,950 B2 | 9/2005 | Takahashi et al. |
| 6,952,761 B2 | 10/2005 | John |
| 6,965,952 B2 | 11/2005 | Echartea et al. |
| 6,977,536 B2 | 12/2005 | Chin-Chieh et al. ......... 327/116 |
| 6,977,979 B1 | 12/2005 | Hartwell et al. |
| 6,993,612 B2 | 1/2006 | Porterfield |
| 6,996,639 B2 | 2/2006 | Narad |
| 7,039,755 B1 | 5/2006 | Helms |
| 7,047,370 B1 | 5/2006 | Jeter, Jr. et al. |
| 7,047,371 B2 | 5/2006 | Dortu |
| 7,047,384 B2 | 5/2006 | Bodas et al. |
| 7,051,172 B2 | 5/2006 | Mastronarde et al. |
| 7,076,700 B2 | 7/2006 | Rieger |
| 7,091,890 B1 | 8/2006 | Sasaki et al. |
| 7,103,792 B2 | 9/2006 | Moon |
| 7,120,743 B2 | 10/2006 | Meyer et al. |
| 7,133,790 B2 | 11/2006 | Liou |
| 7,133,972 B2 | 11/2006 | Jeddeloh |
| 7,155,016 B1 | 12/2006 | Betts et al. |
| 7,177,211 B2 * | 2/2007 | Zimmerman ................ 365/201 |
| 7,194,593 B2 | 3/2007 | Schnepper |
| 7,197,594 B2 | 3/2007 | Raz et al. |
| 7,203,318 B2 | 4/2007 | Collum et al. |
| 7,206,887 B2 | 4/2007 | Jeddeloh |
| 7,206,962 B2 | 4/2007 | Deegan |
| 7,210,059 B2 | 4/2007 | Jeddeloh |
| 7,216,196 B2 | 5/2007 | Jeddeloh |
| 7,216,276 B1 | 5/2007 | Azimi et al. |
| 7,222,213 B2 | 5/2007 | James |
| 7,227,949 B2 | 6/2007 | Heegard et al. |
| 7,240,145 B2 | 7/2007 | Holman |
| 7,260,685 B2 | 8/2007 | Lee et al. |
| 7,266,634 B2 | 9/2007 | Ware et al. |
| 7,296,129 B2 | 11/2007 | Gower et al. |
| 7,313,583 B2 | 12/2007 | Porten et al. |
| 7,319,340 B2 | 1/2008 | Jeddeloh et al. |
| 7,321,979 B2 | 1/2008 | Lee |
| 7,353,316 B2 | 4/2008 | Erdmann |
| 7,363,419 B2 | 4/2008 | Cronin et al. |
| 7,363,436 B1 | 4/2008 | Yeh et al. |
| 7,370,134 B2 | 5/2008 | Jeddeloh |
| 7,376,146 B2 | 5/2008 | Beverly et al. |
| 7,386,575 B2 | 6/2008 | Bashant et al. |
| 7,418,526 B2 * | 8/2008 | Jeddeloh ..................... 710/5 |
| 7,421,525 B2 | 9/2008 | Polzin et al. |
| 7,433,258 B2 * | 10/2008 | Rao et al. ............. 365/230.03 |
| 2001/0000822 A1 | 5/2001 | Dell et al. ............... 711/170 |
| 2001/0003839 A1 | 6/2001 | Kondo ..................... 711/144 |
| 2001/0029566 A1 | 10/2001 | Shin |
| 2002/0019926 A1 | 2/2002 | Huppenthal et al. .......... 712/15 |
| 2002/0038405 A1 | 3/2002 | Leddige et al. ............ 711/115 |
| 2002/0059439 A1 | 5/2002 | Arroyo et al. |
| 2002/0083255 A1 | 6/2002 | Greeff et al. ................ 710/305 |
| 2002/0103988 A1 | 8/2002 | Dornier ..................... 712/38 |
| 2002/0112119 A1 | 8/2002 | Halbert et al. ............. 711/115 |
| 2002/0112194 A1 | 8/2002 | Uzelac ..................... 713/500 |
| 2002/0124195 A1 | 9/2002 | Nizar ....................... 713/320 |
| 2002/0124201 A1 | 9/2002 | Edwards et al. |
| 2002/0147898 A1 | 10/2002 | Rentschler et al. .......... 711/170 |
| 2002/0174274 A1 | 11/2002 | Wu et al. .................... 710/100 |
| 2003/0009632 A1 | 1/2003 | Arimilli et al. |
| 2003/0028701 A1 | 2/2003 | Rao et al. |
| 2003/0033364 A1 | 2/2003 | Garnett et al. ............... 709/203 |
| 2003/0051055 A1 | 3/2003 | Parrella et al. |
| 2003/0056183 A1 | 3/2003 | Kobayashi |
| 2003/0084309 A1 | 5/2003 | Kohn ........................ 713/189 |
| 2003/0090879 A1 | 5/2003 | Doblar et al. |
| 2003/0105938 A1 | 6/2003 | Cooksey et al. |
| 2003/0118044 A1 | 6/2003 | Blanc et al. |
| 2003/0126354 A1 * | 7/2003 | Kahn et al. ................ 711/105 |
| 2003/0126363 A1 | 7/2003 | David |
| 2003/0223303 A1 | 12/2003 | Lamb et al. ............ 365/230.06 |
| 2003/0229770 A1 | 12/2003 | Jeddeloh |
| 2003/0235222 A1 | 12/2003 | Bridges et al. |
| 2003/0236959 A1 | 12/2003 | Johnson et al. ............. 711/167 |
| 2004/0006674 A1 | 1/2004 | Hargis et al. ................. 711/156 |
| 2004/0015650 A1 | 1/2004 | Zumkehr et al. |
| 2004/0049723 A1 | 3/2004 | Obara ....................... 714/729 |
| 2004/0078615 A1 | 4/2004 | Martin et al. |
| 2004/0098546 A1 | 5/2004 | Bashant et al. |
| 2004/0098549 A1 | 5/2004 | Dorst |
| 2004/0117588 A1 | 6/2004 | Arimilli et al. .............. 711/203 |
| 2004/0123222 A1 | 6/2004 | Widmer |
| 2004/0128474 A1 | 7/2004 | Vorbach ..................... 712/10 |
| 2004/0148482 A1 | 7/2004 | Grundy et al. |
| 2004/0160832 A1 | 8/2004 | Janzen et al. |
| 2004/0163028 A1 | 8/2004 | Olarig |
| 2004/0165609 A1 | 8/2004 | Herbst et al. |
| 2004/0199363 A1 | 10/2004 | Bohizic et al. |
| 2004/0205433 A1 | 10/2004 | Gower et al. |
| 2004/0230718 A1 | 11/2004 | Polzin et al. |
| 2004/0246767 A1 | 12/2004 | Vogt ........................ 365/154 |
| 2004/0250153 A1 | 12/2004 | Vogt ........................ 713/500 |
| 2004/0260909 A1 | 12/2004 | Lee et al. |
| 2004/0260957 A1 | 12/2004 | Jeddeloh et al. |
| 2005/0023560 A1 | 2/2005 | Ahn et al. ................... 257/200 |
| 2005/0027941 A1 | 2/2005 | Wang et al. |
| 2005/0044305 A1 | 2/2005 | Jakobs et al. |
| 2005/0050237 A1 | 3/2005 | Jeddeloh et al. ............. 710/10 |
| 2005/0050255 A1 | 3/2005 | Jeddeloh ..................... 710/317 |
| 2005/0066136 A1 | 3/2005 | Schnepper ................. 711/154 |
| 2005/0071542 A1 * | 3/2005 | Weber et al. ................ 711/105 |
| 2005/0071707 A1 | 3/2005 | Hampel |
| 2005/0078506 A1 * | 4/2005 | Rao et al. ................... 365/154 |
| 2005/0080581 A1 | 4/2005 | Zimmerman et al. ......... 702/117 |
| 2005/0081129 A1 | 4/2005 | Shah et al. |
| 2005/0086424 A1 | 4/2005 | Oh et al. |
| 2005/0086441 A1 | 4/2005 | Myer et al. |
| 2005/0097249 A1 | 5/2005 | Oberlin et al. |
| 2005/0105350 A1 * | 5/2005 | Zimmerman ................ 365/201 |
| 2005/0120157 A1 | 6/2005 | Chen et al. .................. 710/313 |
| 2005/0125702 A1 | 6/2005 | Huang et al. |
| 2005/0125703 A1 | 6/2005 | Lefurgy et al. |
| 2005/0138246 A1 | 6/2005 | Chen et al. |
| 2005/0138267 A1 | 6/2005 | Bains et al. |
| 2005/0144399 A1 | 6/2005 | Hosomi ..................... 711/145 |
| 2005/0149665 A1 | 7/2005 | Wolrich et al. |
| 2005/0166006 A1 | 7/2005 | Talbot et al. |
| 2005/0177677 A1 | 8/2005 | Jeddeloh |
| 2005/0177690 A1 | 8/2005 | LaBerge ..................... 711/154 |
| 2005/0204216 A1 | 9/2005 | Daily et al. ................. 714/724 |
| 2005/0216678 A1 | 9/2005 | Jeddeloh |
| 2005/0220097 A1 | 10/2005 | Swami et al. |
| 2005/0223196 A1 | 10/2005 | Knowles |
| 2005/0229132 A1 | 10/2005 | Butt et al. ..................... 716/10 |
| 2005/0248997 A1 | 11/2005 | Lee |
| 2005/0257005 A1 | 11/2005 | Jeddeloh |
| 2005/0259496 A1 | 11/2005 | Hsu et al. .................... 365/226 |

| | | |
|---|---|---|
| 2005/0289292 A1 | 12/2005 | Morrow et al. |
| 2005/0289377 A1 | 12/2005 | Luong |
| 2006/0004953 A1 | 1/2006 | Vogt |
| 2006/0036826 A1 | 2/2006 | Dell et al. |
| 2006/0036827 A1 | 2/2006 | Dell et al. |
| 2006/0080584 A1 | 4/2006 | Hartnett et al. |
| 2006/0085602 A1 | 4/2006 | Huggahalli et al. |
| 2006/0095592 A1 | 5/2006 | Borkenhagen |
| 2006/0095679 A1 | 5/2006 | Edirisooriya |
| 2006/0104371 A1 | 5/2006 | Schuermans et al. |
| 2006/0107175 A1 | 5/2006 | Dell et al. |
| 2006/0112238 A1 | 5/2006 | Jamil et al. |
| 2006/0161733 A1 | 7/2006 | Beckett et al. |
| 2006/0162882 A1 | 7/2006 | Ohara et al. |
| 2006/0168407 A1* | 7/2006 | Stern .................. 711/154 |
| 2006/0179208 A1 | 8/2006 | Jeddeloh |
| 2006/0190674 A1 | 8/2006 | Poechmueller |
| 2006/0195631 A1 | 8/2006 | Rajamani |
| 2006/0206742 A1 | 9/2006 | James |
| 2006/0212666 A1* | 9/2006 | Jeddeloh .............. 711/154 |
| 2006/0224764 A1 | 10/2006 | Shinohara et al. |
| 2006/0277365 A1 | 12/2006 | Pong |
| 2006/0288172 A1 | 12/2006 | Lee et al. |
| 2007/0005922 A1 | 1/2007 | Swaminathan et al. |
| 2007/0025304 A1 | 2/2007 | Leelahakriengkrai et al. |
| 2007/0038907 A1 | 2/2007 | Jeddeloh et al. |
| 2007/0067382 A1 | 3/2007 | Sun |
| 2007/0083701 A1 | 4/2007 | Kapil |
| 2007/0160053 A1 | 7/2007 | Coteus et al. |
| 2008/0043808 A1 | 2/2008 | Hsu et al. |
| 2008/0162807 A1* | 7/2008 | Rothman et al. ........ 711/114 |
| 2008/0222379 A1 | 9/2008 | Jeddeloh |

FOREIGN PATENT DOCUMENTS

| | | |
|---|---|---|
| EP | 0470734 A1 | 2/1992 |
| EP | 0899743 A2 | 6/1998 |
| EP | 1429340 A2 | 6/2004 |
| GB | 2396711 A | 6/2004 |
| JP | 59153353 A | 9/1984 |
| JP | 0114140 A | 6/1989 |
| JP | 0432614 | 11/1992 |
| JP | 10011971 | 1/1998 |
| JP | 2004139552 A | 5/2004 |
| JP | 2008003711 A | 1/2008 |
| WO | 9621188 | 7/1996 |
| WO | 9812651 | 3/1998 |
| WO | 200004481 | 1/2000 |
| WO | 0223353 A2 | 3/2002 |
| WO | WO2005038660 | 4/2005 |
| WO | 2007109888 | 10/2007 |

OTHER PUBLICATIONS

PCT International Search Report PCT/EP2006/068984. Mailed Feb. 16, 2007.

PCT International Search Report PCT/EP2007/057916. Mailed Dec. 14, 2007.

Wikipedia, Serial Communications, [online], [retrieved Apr. 10, 2007 from the Internet], http://en.wikipedia.org/wiki/Serial_communications, 3 pages.

International Search Report, International Application No. PCT/EP2007/054929, International Publication No. WO 2007/135144 A1, received Mar. 21, 2008.

IEEE, "IEEE Standard Test Access Port and Boundary-Scan Architecture", Jul. 23, 2001, IEEE Std 1149-1-2001, pp. 11-13.

Rosenberg, "Dictionary of Computers, Information Processing & Telecommunications", Second Edition, John Wiley & Sons, Inc. 1987. 3 pgs.

Joe Jeddeloh, Fully Buffered DIMM (FB-DIMM), XP002490174, Advanced Systems Technology, Micron Technology, Inc. Apr. 16, 2008, 32 pages.

Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.

"Using Dual and Mappable Spare Bus", XP000433763, IBM Technical Disclosure Bulletin, vol. 37, No. 2B, IBM Copr., NY, US, Feb. 1, 1994, pp. 59-63.

"Novel Bus Reconfiguration Scheme With Spare Lines", XP000676205, IBM Technical Disclosure Bulletin, vol. 29, No. 12, IBM Copr., NY, US, May 12, 1987, pp. 5590-5593.

European Search Report, European Patent Application 05106700.7, received Aug. 11, 2008.

International Search Report, International Patent Application No. PCT/US07/75944, mailed Sep. 23, 2008, 3 pages.

European Search Report, European Patent Application No. 05106701.5, mailed Oct. 7, 2008, 5 pages.

European Search Report, European Patent Application No. 05109837.4, mailed Oct. 7, 2008, 5 pages.

PCT Search Report. PCT/EP2007/057915. Mailed Nov. 7, 2007.

Luca Benini, et al., "System-Level Powers Optimization: Techniques and Tools", ACM Transactions on Design Automation of Electronic Systems, vol. 5, No. 2, Apr. 2000, pp. 115-192.

Boudon, et al., "Novel Bus Reconfiguration Scheme With Spare Lines", IBM Technical Disclosure Bulletin, May 1987, vol. 29, No. 12, pp. 1-3.

Brown, et al "Compiler-Based I/O Prefetching for Out-of-Core Applications", ACM Transactions on Computer Systems, vol. 19, No. 2, May 2001, pp. 111-170.

Ghoneima et al.; "Optimum Positioning of Interleaved Repeaters in Bidirection Buses;" IEEE Transactions on Computer-Aided Design of Integrated Circuits and Systems, vol. 25, No. 3, Mar. 2005, pp. 461-469.

JEDEC Solid State Technology Association, "JEDEC Standard: DDR2 SDRAM Specification", Jan. 2004, JEDEC, Revision JESD79-2A, p. 10.

Jungjoon Kim et al.; "Performance and Architecture Features of Segmented Multiple Bus System;" IEEE Computer Society; 1999 International Conference on Parallel Processing (ICPP '99).

Massoud Pedram, "Power Minimization in IC Design Principles and Applications", ACM Transactions on Design Automation of Electronic Systems vol. 1, No. 1, Jan. 1996, pp. 3-56.

NB940259 (IBM Technical Disclosure Bulletin, Feb. 1994; vol. 37; pp. 59-64).

P.R. Panda, "Data and Memory Optimization Techniques For Embedded Systems", ACM Transactions on Design Automation of Electronic Systems, vol. 6, No. 2, Apr. 2001, pp. 149-206.

Penrod, Lee, "Understanding System Memory and CPU Speeds: A laymans guide to the Front Side Bus (FSB)", Dec. 28, 2005, Direction . Org, pp. 1-5, http://www.directron.com/directron/fsbguide.html. [online]; [retrieved on Feb. 23, 2006]; retrieved from the Internet.

Seceleanu et al.; "Segment Arbiter as Action System;" IEEE 2003 pp. 249-252.

Singh, S., et al., "Bus Sparing for Fault-Tolerant System Design", IBM Technical Disclosure Bulletin, Dec. 1991, vol. 34, No. 71, pp. 117-118.

Sivencrona et al.; "RedCAN™: Simulations of two Fault Recovery Algorithms for CAN;" Proceedings for the 10th IEEE Pacific Rim International Symposium on Dependable Computing (PRDC'04); 2005.

Yang, Q.; Bhuyan, L.N., "Analysis of packet-switched multiple-bus multiprocessor systems," Computers, IEEE Transactions on, vol. 40, No. 3, pp. 352-357, Mar. 1991.

Li, P; Martinez, J.; Tang, J.; Priore, S.,; Hubbard, K.; Jie Xue; Poh, E.; Ong MeiLin; Chok KengYin; Hallmark, C.; Mendez, D.; "Development and evaluation of a high performance fine pitch SODIMM socket package." Electronic Components and Technology Conference, 2004. Proceedings. 54th, vol.1 , pp. 1161-1166, Jun. 1-4, 2004.

Nilsen, "High-Level Dynamic Memory Management for Object-Oriented Real-Time Systems", Jan. 1, 1996, pp. 86-93.

Wang, et al., "Guided Region Prefetching: A Cooperative Hardware/Software Approach", Jun. 2003, pp. 388-398.

Natarajan, et al., "A Study of Performance Impact of Memory Controller Features in Multi-Processor Server Environment", WMPI, Jun. 2004, pp. 80-87.

"Using Dual and Mappable Spare Bus", XP000433763, IBM Technical Disclosure Bulletin, vol. 37, No. 2B, IBM Corp., NY, US, Feb. 1, 1994, pp. 59-63.

* cited by examiner

SYSTEMS AND METHODS FOR PROVIDING A DYNAMIC MEMORY BANK PAGE POLICY

BACKGROUND OF THE INVENTION

This invention relates generally to computer memory, and more particularly to providing a dynamic memory bank page policy.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 10 which includes a synchronous memory module 220 that is directly (i.e. point-to-point) connected to a memory controller 14 via a bus 240, and which further includes logic circuitry 24 (such as an application specific integrated circuit, or "ASIC") that buffers, registers or otherwise acts on the address, data and control information that is received from the memory controller 14. The memory module 220 can be programmed to operate in a plurality of selectable or programmable modes by way of an independent bus, such as an inter-integrated circuit I2C control bus 34, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. No. 5,513,135, U.S. Pat. No. 6,173,382 further demonstrates the capability of integrating all of the defined functions (address, command, data, presence detect, etc) into a single device. The integration of functions is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 10 that includes Up to four registered DIMMs 40 on a traditional multi-drop stub bus. The subsystem includes a memory controller 20, an external clock buffer 30, registered DIMMs 40, an address bus 50, a control bus 60 and a data bus 70 with terminators 95 on the address bus 50 and the data bus 70. Although only a single memory channel is shown in FIG. 3, systems produced with these modules often included more than one discrete memory channel from the memory controller, with each of the memory channels operated singly (when a single channel was populated with modules) or in parallel (when two or more channels where populated with modules) to achieve the desired system functionality and/or performance.

FIG. 4, from U.S. Pat. No. 6,587,912 to Bonella et al., depicts a synchronous memory module 410 and system structure in which the repeater hubs 320 include local re-drive of the address, command and data to the local memory devices 301 and 302 via buses 321 and 322; generation of a local clock (as described in other figures and the patent text); and the re-driving of the appropriate memory interface signals to the next module or component in the system via bus 300.

FIG. 5 depicts a contemporary system composed of an integrated processor chip 500, which contains one or more processor elements and an integrated memory controller 510. In the configuration depicted in FIG. 5, multiple independent cascade interconnected memory busses 506 are logically aggregated together to operate in unison to support a single independent access request at a higher bandwidth with data and error detection/collection information distributed or "striped" across the parallel busses and associated devices. The memory controller 510 attaches to four narrow/high speed point-to-point memory busses 506, with each bus 506 connecting one of the several unique memory controller interface channels to a cascade interconnected memory subsystem 503 (or memory module) which includes at least a hub device 504 and one or more memory devices 509. Some systems further enable operations when a subset of the memory busses 506 are populated with memory subsystems 503. In this case, the one or more populated memory busses 508 may operate in unison to support a single access request.

FIG. 6 depicts a block diagram of a memory hub device 504 including a link interface 604 for providing the means to re-synchronize, translate and re-drive high speed memory access information to associated DRAM devices 509 and/or to re-drive the information downstream on memory bus 506 as applicable based on the memory system protocol. The information is received by the link interface 604 from an upstream memory hub device 504 or from a memory controller 510 (directly or via an upstream memory hub device 504) via the memory bus 506. The memory device data interface 615 manages the technology-specific data interface with the memory devices 509 and controls the bi-directional memory device data bus 608. The memory hub control 613 responds to access request packets by responsively driving the memory device 509 technology-specific address and control bus 614 (for memory devices in RANK0 501) or address and control bus 614' (for memory devices in RANK1 616) and directing the read data flow 607 and write data flow 610 selectors.

The link interface 604 in FIG. 6 decodes the packets and directs the address and command information directed to the local hub device 504 to the memory hub control 613. Memory write data from the link interface 604 can be temporarily stored in the write data queue 611 or directly driven to the memory devices 509 via the write data flow selector 610 and internal bus 612, and then sent via internal bus 609 and memory device data interface 615 to memory device data bus 608. Memory read data from memory device(s) 509 can be queued in the read data queue 606 or directly transferred to the link interface 604 via internal bus 605 and read data selector 607, to be transmitted on the upstream bus 506 as a read reply packet.

In high performance memory subsystem design, there is a desire to utilize the maximum available bandwidth on the memory bus to maximize overall system performance, as well as to reduce the latency of read commands whenever possible such that any given operation can be completed in a minimum amount of time. Many methods are utilized in the industry in an attempt to achieve these goals, including the use of very high performance memory devices, the use of very wide memory busses to connect the memory devices to the memory controller, the use of one or more levels of memory caches placed as close to the processor and/or memory controller as possible, the use of either bank open or bank closed page policies based on the system design and software optimization, the use of memory pre-fetch algorithms by the memory controller, etc. While all of these methods provide varying overall system performance benefits, many can prove very costly to implement in terms of overall system cost, physical system size, system power/cooling, etc.

Current main memory system solutions may utilize a "static" (e.g. unchanging) bank page policy (either with "open" or "closed" pages) that is not changed once the system is running in a normal operating mode. In addition, the bank page policy function is implemented in the memory controller circuitry with the memory subsystem acting as a slave device responding to explicit commands from the memory controller. A further characteristic of the current approach is that memory accesses from the memory subsystem(s) are "deterministic" in nature in that the time evolution associated with each memory operation can be predicted exactly by the memory controller, which is responsible for scheduling all memory operations such that no data corruption occurs and that all memory specifications are met during normal operation.

Drawbacks to the current static approach include the fact that the hub chip cannot change its bank open/bank closed page policy when command streams are present that might better be serviced by another method. In a computer memory system, it is likely that at certain times a bank, open page policy might result in optimal performance (e.g., when memory is accessed in a sequential manner), whereas at other times a bank closed page policy might result in optimal performance (e.g., when memory is accessed in a random manner). It would be desirable to be able to dynamically switch between a bank open page policy and a bank closed page policy based on an analysis of a command stream received at a memory hub device.

BRIEF SUMMARY OF THE INVENTION

Embodiments include a hub device for selecting a bank page policy. The hub device includes an input command stream interface and a bank page policy module. The input command stream interface detects commands from a memory controller that are directed to one or more memory devices that are connected to the hub device. The bank page policy module independently analyzes the commands to determine access patterns to the memory devices and for dynamically selecting between an open bank page policy and a closed bank page policy for the memory devices based on the analysis.

Embodiments also include a method for selecting a bank page policy. The method includes detecting commands from a memory controller directed to one or more memory devices. The commands are analyzed to determine access patterns to the memory devices. The method further dynamically selects between an open bank page policy and a closed bank page policy for the memory devices based on the analysis.

Embodiments also include a memory system including a memory controller, one or more memory devices and a memory hub device in communication with the memory controller and the memory devices. The memory hub device includes an input command stream interface for detecting commands from the memory controller directed to the memory devices. The memory hub device also includes a bank page policy module for independently analyzing the commands to determine access patterns to the memory devices and for dynamically selecting between an open bank page policy and a closed bank page policy for the memory devices based on the analysis.

Further embodiments include a memory subsystem including one or more memory device and a memory hub device. The memory hub device includes an input command stream interface for detecting commands from a memory controller directed to the memory devices. The memory hub device also includes a bank page policy module for independently analyzing the commands to determine access patterns to the memory devices and for dynamically selecting between an open bank page policy and a closed bank page policy for the memory devices based on the analysis.

Further embodiments include a memory controller for receiving and responding to memory access requests. The memory controller includes an input command stream interface for detecting commands directed to selected memory devices. The memory controller also includes a bank page policy module for independently analyzing the commands to determine access patterns to the selected memory devices and for dynamically selecting between an open bank page policy and a closed bank page policy for the selected memory devices based on the analysis.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
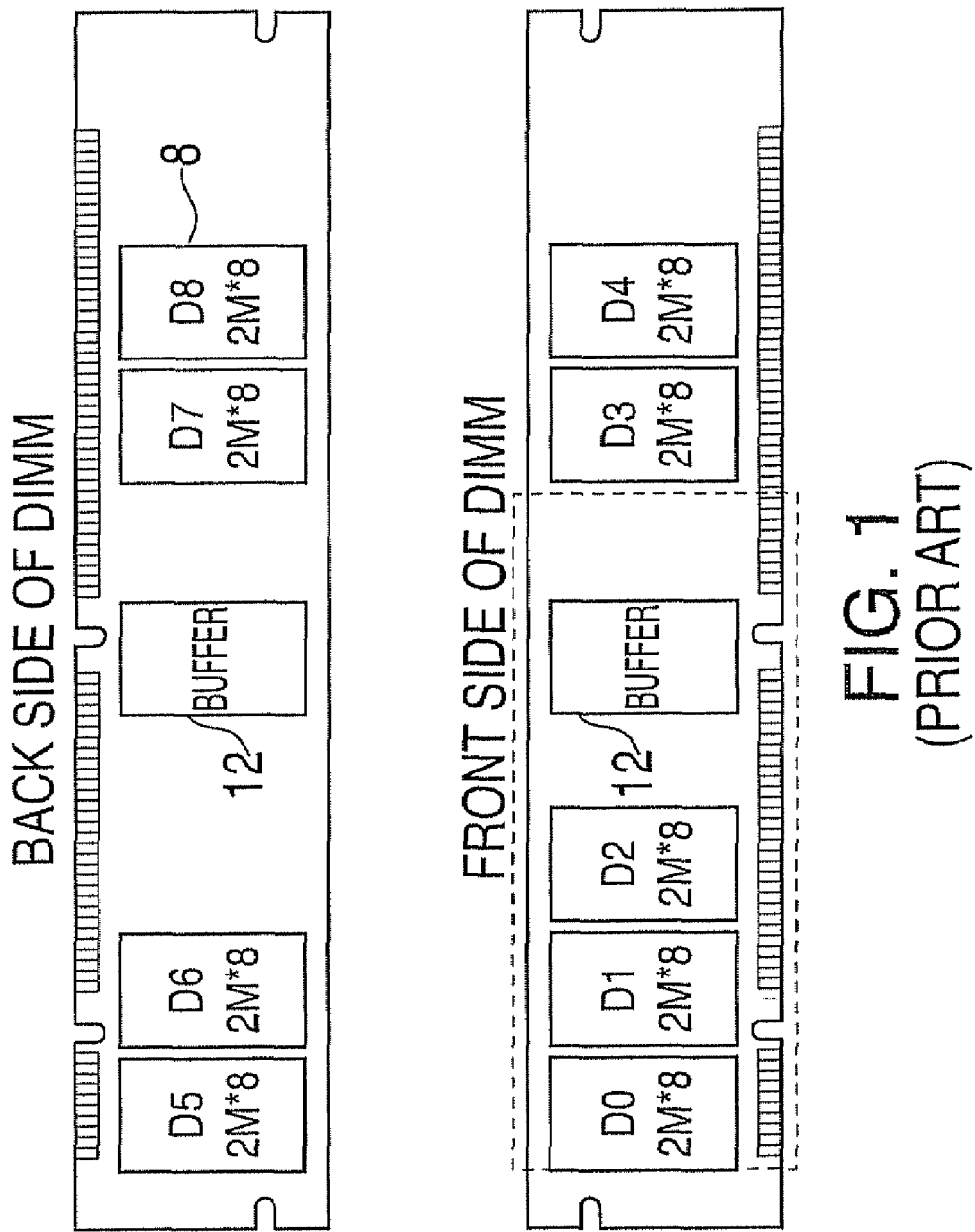
FIG. 1 depicts an exemplary early synchronous memory module.
Figure 2:
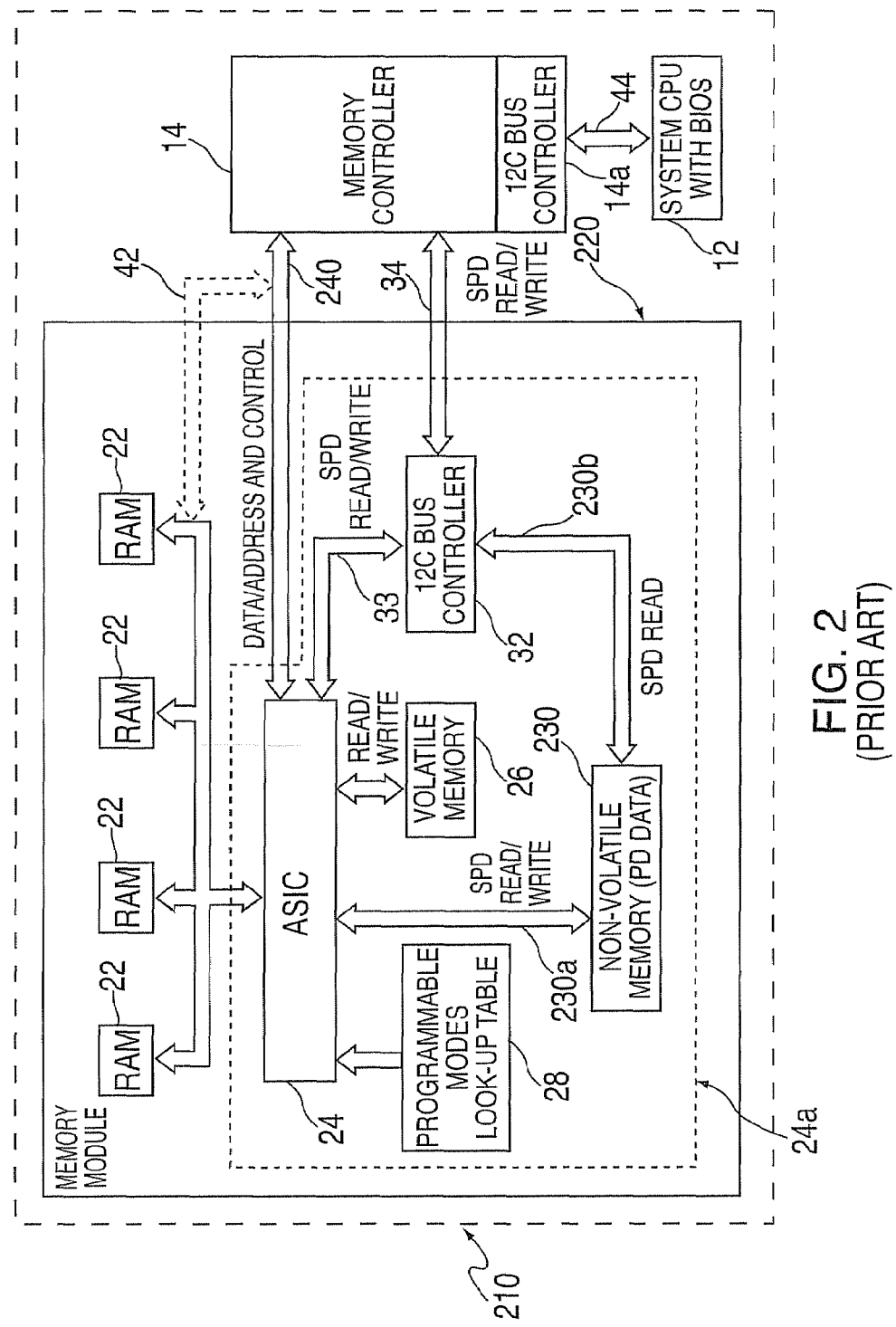
FIG. 2 depicts an exemplary computer system with a fully buffered synchronous memory module that is directly connected to a memory controller.
Figure 3:
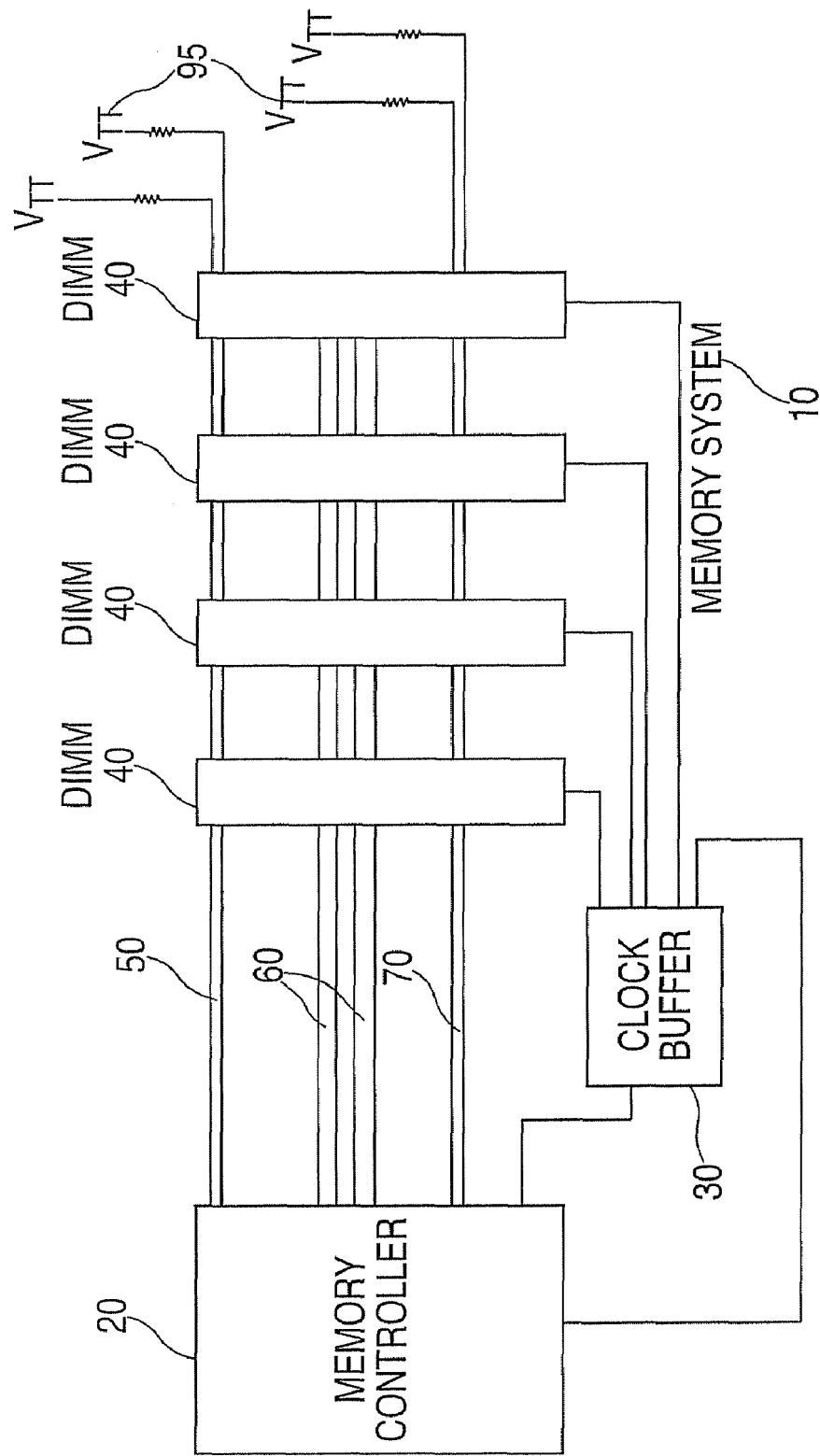
FIG. 3 depicts an exemplary memory system, shown with a single, traditional multi-drop stub bus.
Figure 4:
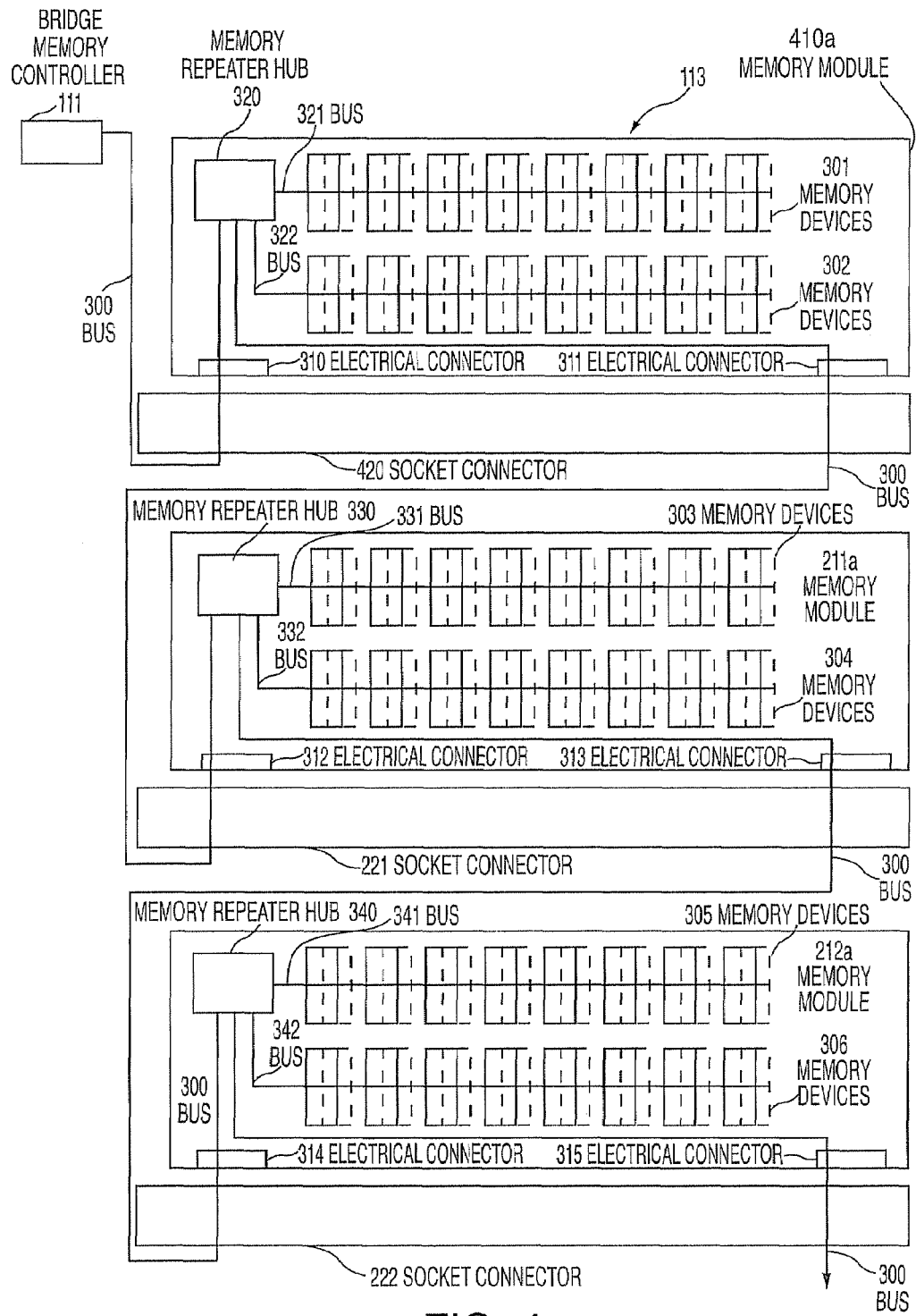
FIG. 4 depicts a fully buffered synchronous memory module and system structure, where the fully buffered synchronous memory module includes a repeater function.
Figure 5:
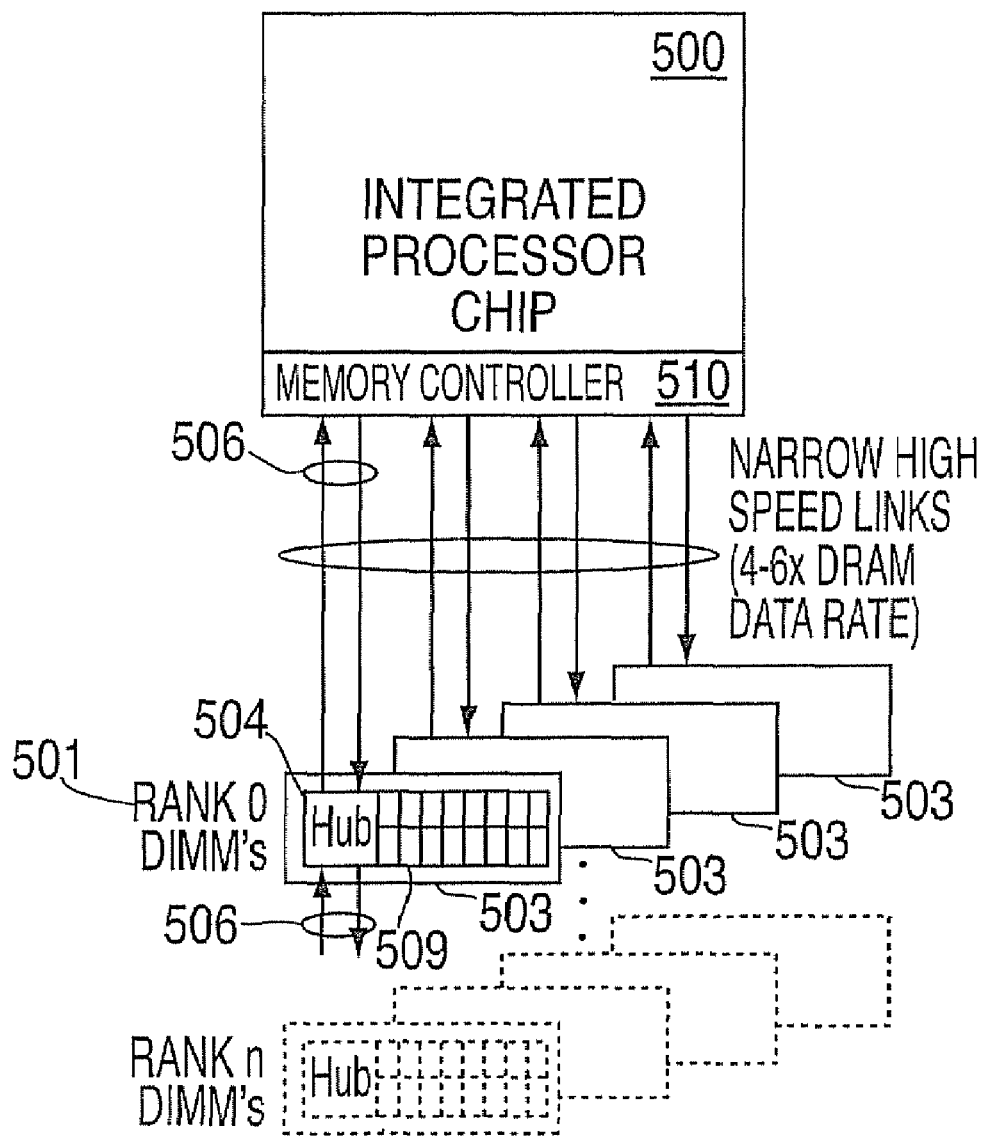
FIG. 5 depicts a block diagram of a computer memory system which includes multiple independent cascade interconnect memory interface busses that operate in unison to support a single data access request.

Exemplary embodiments increase memory performance by dynamically selecting between an open bank page policy and a closed bank page policy during runtime based on memory access requests received at a hub device from a memory controller. The memory access requests are independently analyzed at the hub device to determine the access patterns to the memory devices attached to the hub device. Based on the analysis, a bank page policy is selected for the memory devices (e.g., for all of the memory devices, for individual memory devices and/or for banks on individual memory devices). Exemplary embodiments reduce memory system inefficiencies inherent with static page policy implementations. These inefficiencies often result in added memory latency due to the need to open a page that was recently accessed and closed, or due to the need to close a page that was previously left open, to allow a different page to be accessed.

One of the key elements of a memory system design is related to the bank page policy used (bank open or bank closed). The wait time to close or to re-open a page is relatively long, and therefore, selection of a bank page policy which is inconsistent with the application command stream can result in system performance which is measurably worse than can be achieved with the use of an alternate page policy. By dynamically selecting the optimal page policy for a given command stream, the memory device address and control bus 614 614' bandwidth requirements may be reduced due to a reduction in precharge and/or row activation command sequences that must be issued, since the memory will more often already be in the optimal state for the next access.

As used herein, the term "page" refers to a portion of a multiplexed address DRAM that is activated with the receipt of a row address. As used herein, the phrase "bank closed page policy" refers to a method of operating a memory in which the memory devices 509 are returned to a pre-charged (e.g., standby) condition upon completion of a memory operation such as a "read" or "write." As such, the next access can be made to any address within the memory. As used herein, the phrase "bank open page policy" refers to a method of operating a memory in which the memory devices 509 are left in a state where the row address (page) remains selected. This state is also referred to as an "active/standby" state, and the memory devices 509 can be accessed upon receipt of a column address. As such, accesses can only be made to an address within the selected page, until the memory is pre-charged. As used herein, the phrase "bank open/close logical unit" (BOCLU) refers to circuitry and/or software instructions used to record the current memory bank page policy state. The circuitry and/or software instructions within the BOCLU includes counters to record the number of consecutive accesses to a page within a bank, as well as registers to record the last address accessed.

To enable a dynamic bank open/close policy, at least one BOCLU is utilized, with as many as one BOCLU per memory bank in the memory system. In exemplary embodiments with the least granularity of control, there is one general purpose BOCLU engine monitoring the address stream (or input command stream) that acts upon the entire memory subsystem 503 to which it is collected. In other exemplary embodiments, one BOCLU is utilized per memory bank, providing optimal flexibility and memory performance. In addition, some memory devices 509 in the memory subsystem 503 may have one BOCLU per memory bank, where other memory devices 509 in the same memory subsystem 503 may be monitored by one BOCLU per memory device 509. Further embodiments may include one BOCLU per memory device address and control bus 614 614'. These and other embodiments may be implemented based on the degree of granularity required in determining whether to switch between a bank open page policy and a bank closed page policy. These examples are meant to be exemplary in nature and many other combinations are possible.

Figure 7:
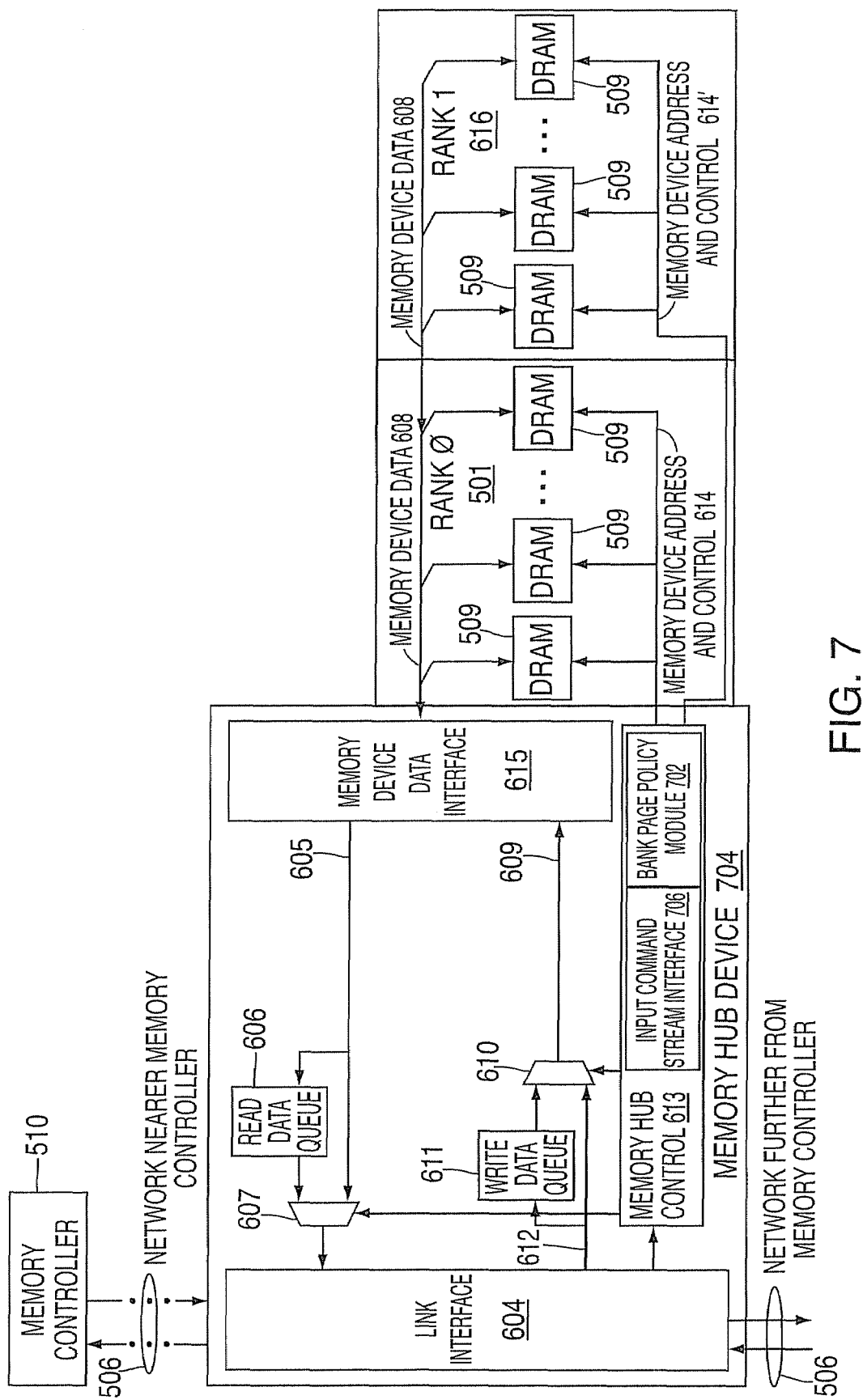
FIG. 7 is a block diagram of an exemplary hub device including a bank page policy module that may be implemented by exemplary embodiments.

FIG. 7 is a block diagram of an exemplary memory hub device 704 that may be utilized by exemplary embodiments. The hub device 704 includes an input command stream interface 706 for detecting commands from a memory controller 510 that are directed to one or more memory devices 509 that are connected to the hub device 704. The hub device 704 also includes a bank page policy module 702 (which includes one or more BOCLUs) for independently analyzing the commands to determine access patterns to the memory devices 509 and for dynamically selecting between an open bank page policy and a closed bank page policy for the selected memory devices based on the analysis.

Figure 6:
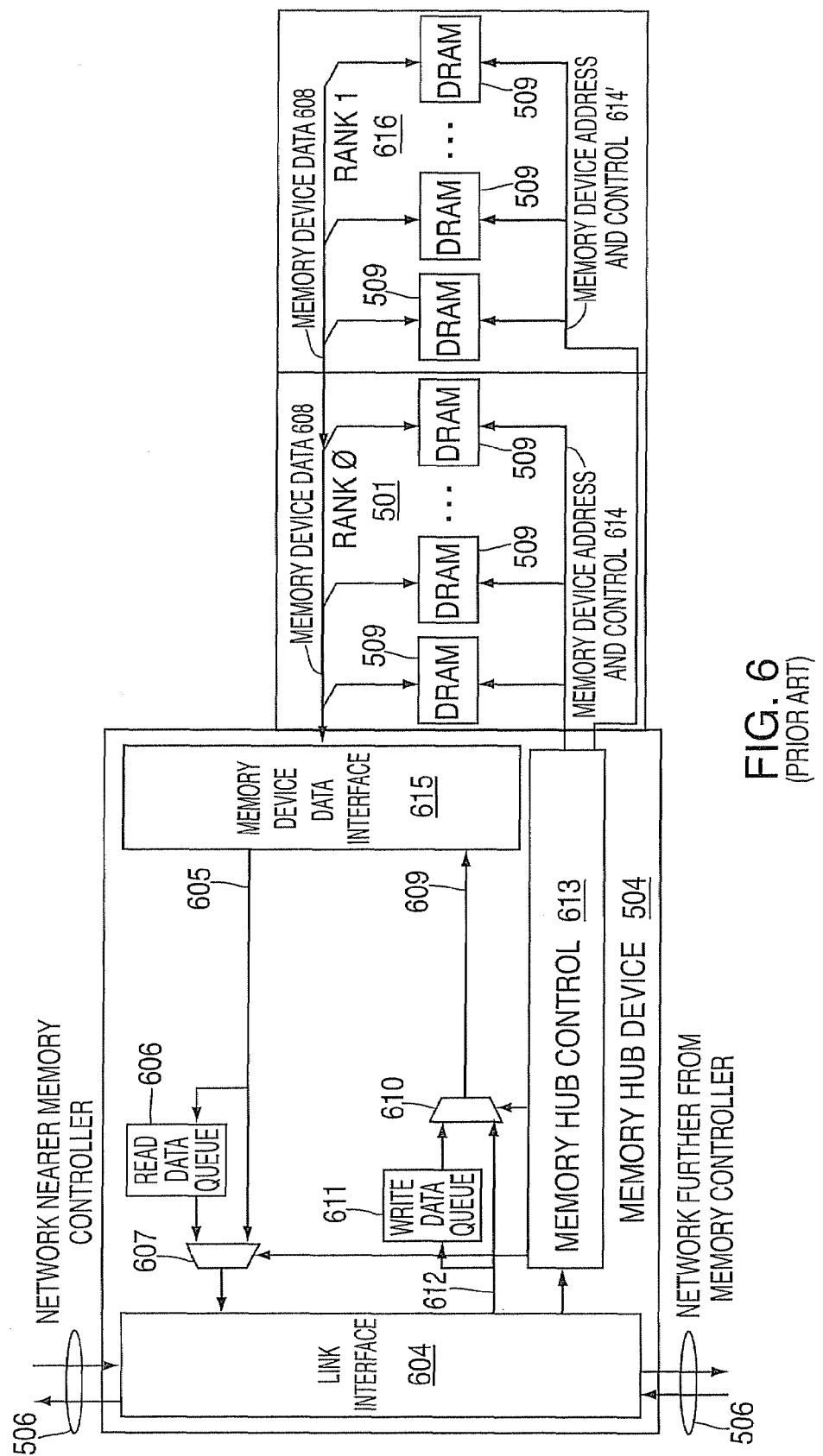
FIG. 6 is a block diagram of an exemplary hub device in a memory subsystem.

The hub device 704 in FIG. 7 performs the same functions described above with reference to FIG. 6 along with the added function of executing a dynamic bank open/bank closed page policy. FIG. 7 depicts a bank page policy module 702 that is implemented by one or more BOCLUs for performing the memory bank page policy functions described herein. Each BOCLU corresponds to one or more memory devices 509 (all banks within each memory device 509 and/or one or more specific banks within each memory device 509). In exemplary embodiments, each BOCLU monitors an input command stream (e.g., via an input command stream interface 706 that "snoops" the input command stream for example, at the link interface 604 or the memory hub control 713) from a memory controller 510 to detect commands directed to addresses that are associated with the memory device(s) 509 corresponding to the BOCLU. When such a command is detected, the BOCLU performs an independent analysis (e.g., at the hub device 704) of the commands to determine access patterns (e.g., access is random or sequential) and then the BOCLU dynamically (during runtime) selects either an open bank page policy or a closed bank page policy for the memory devices 509 corresponding to the BOCLU. The selection is communicated to the memory hub control 713 and the memory hub control 713 applies the bank page policy when accessing the memory device(s) 509 (e.g., issues a pre-charge command when the bank page policy is a closed bank page policy).

In exemplary embodiments, each BOCLU monitors the input command stream (e.g., via an input command stream interface 706 that "snoops" the input command stream) from the memory controller 510 to detect commands directed to addresses that are associated with the memory device(s) 509 corresponding to the BOCLU. In alternate exemplary embodiments, a single input command stream interface 706 is utilized within the bank page policy module 702 to detect commands directed to addresses that are associated with all of the memory devices 509 connected to the hub device 704. The input command stream interface 706 then directs (e.g., via a multiplexer) the commands to the correct BOCLU based on the address being accessed by each command. In an exemplary embodiment, the input command stream interface 706 in the bank page policy module 702 (or within each BOCLU within the bank page policy module 702) monitors the address and command information that has been decoded by the link interface 604 as it is being transmitted to the memory hub control 713. In other exemplary embodiments, output from a module(s) located in the memory hub control 713 that is "snooping" the input command stream is utilized by the BOCLU(s). Thus, the command stream interface 706 may be located within each BOCLU in the bank page policy module 702, within the bank page policy module 702 or within the memory hub control 713.

Any number of analysis algorithms may be utilized by a BOCLU located in the bank page policy module 702 to determine whether it is advantageous to switch bank page policy modes between a "closed bank page policy" and an "open bank page policy." Different BOCLUs within the same hub device 704 may utilize different analysis algorithms. In the minimum case, the algorithm tests whether "N" (where N is a positive integer greater than one) consecutive row accesses to the same page have occurred (or are scheduled to occur). If N is greater than or equal to two, the bank page policy would switch to a bank open page policy, as the memory system would not have to wait for the precharge time of the bank. Likewise, if N consecutive row addresses are not directed to the same page, then the bank page policy would switch to the bank closed page policy of operation. In other exemplary embodiments, the number of consecutive row addresses could be more than two prior to a bank page policy change, and could be a variable number, based on the recent history of accesses, as monitored by the BOCLU(s). Other exemplary embodiments may utilize more complicated algorithms, either by default or selectable, that use thresholds, prediction, and/or hysteresis as part of the process for determining if and when to dynamically switch the bank policy of the memory controller, hub device(s) and/or memory device(s).

In other exemplary embodiments, the dynamic bank open/closed page policy is set based on the contents of a memory command buffer, or command stack, (generally a FIFO register containing pending future commands that have been received but not yet executed), whereby the register contents are 'snooped' by the BOCLU or other logic in the memory hub control 713, to identify accesses to one or more pages. If any read access requests exist to a common page, then an open bank page policy is instituted for the duration of those accesses, and the accesses are re-ordered (e.g. executed in a different sequence than originally received) such that common bank accesses do not include other accesses that would require the page to be closed and re-opened to a different page, while those accesses within the page are available to be serviced. In further exemplary embodiments, accesses may not re-ordered in cases such as when one or more high priority accesses, as identified by a "tag", pre-specified address range, access completion timer or other means, would be delayed by this action.

As is known to those skilled in the art, the re-ordering of write operations is also possible, but requires that any subsequent read accesses to the memory location(s) being written be completed subsequent to the write operation in order to maintain data integrity. When the accesses are re-ordered, exemplary embodiments include the use of "tag" bits associated with all memory read transfers to the memory controller 510, such that memory data can be returned to the memory controller 510 either earlier or later than might otherwise be expected in a conventional memory subsystem structure. In addition to other methods of correlating read access transfers to access requests, one example is the use of tag bits as described in U.S. patent application Ser. No. 11/419,586 filed on May 22, 2006 of common assignment herewith, which is hereby incorporated by reference in its entirety.

In other exemplary embodiments, the dynamic bank open/bank closed page policy is set based on a snooping (e.g., by the BOCLU or other logic in the memory hub control 713) of the input command stream, where the input command stream may or may not be stored in a memory command buffer, command stack or similar register. This solution is very similar to that of a system including a command stack, however the available commands are generally limited to recently received commands (which may be stored in received form or compressed form), the current command and possibly the next command. In this case, the analysis of the input command stream is generally historical in nature, whereas the availability of a command stack permits more accurate identification of near-term accesses.

In general, if the next access to a memory bank is for the same page, then the page should be left open, and if the next access to a memory bank is to a different page, then the page should be closed.

In further exemplary embodiments, the memory hub device 704 receives hints and/or other control information from the memory controller 510 regarding future address streams on a periodic basis. Based on this 'hint' information, the hub device 704 may determine an access pattern and modify the bank page policy for one or more banks. In other embodiments, the memory controller 510 notifies the hub device 704 that one or more additional commands are forthcoming (e.g. in the memory controller scheduler or buffer) that will access the same memory page. In response to the receipt of this command, the hub device 704 modifies the bank page policy (if needed) to be consistent with the information received with the current memory command, such that execution of the subsequent accesses can be optimized.

Figure 8:
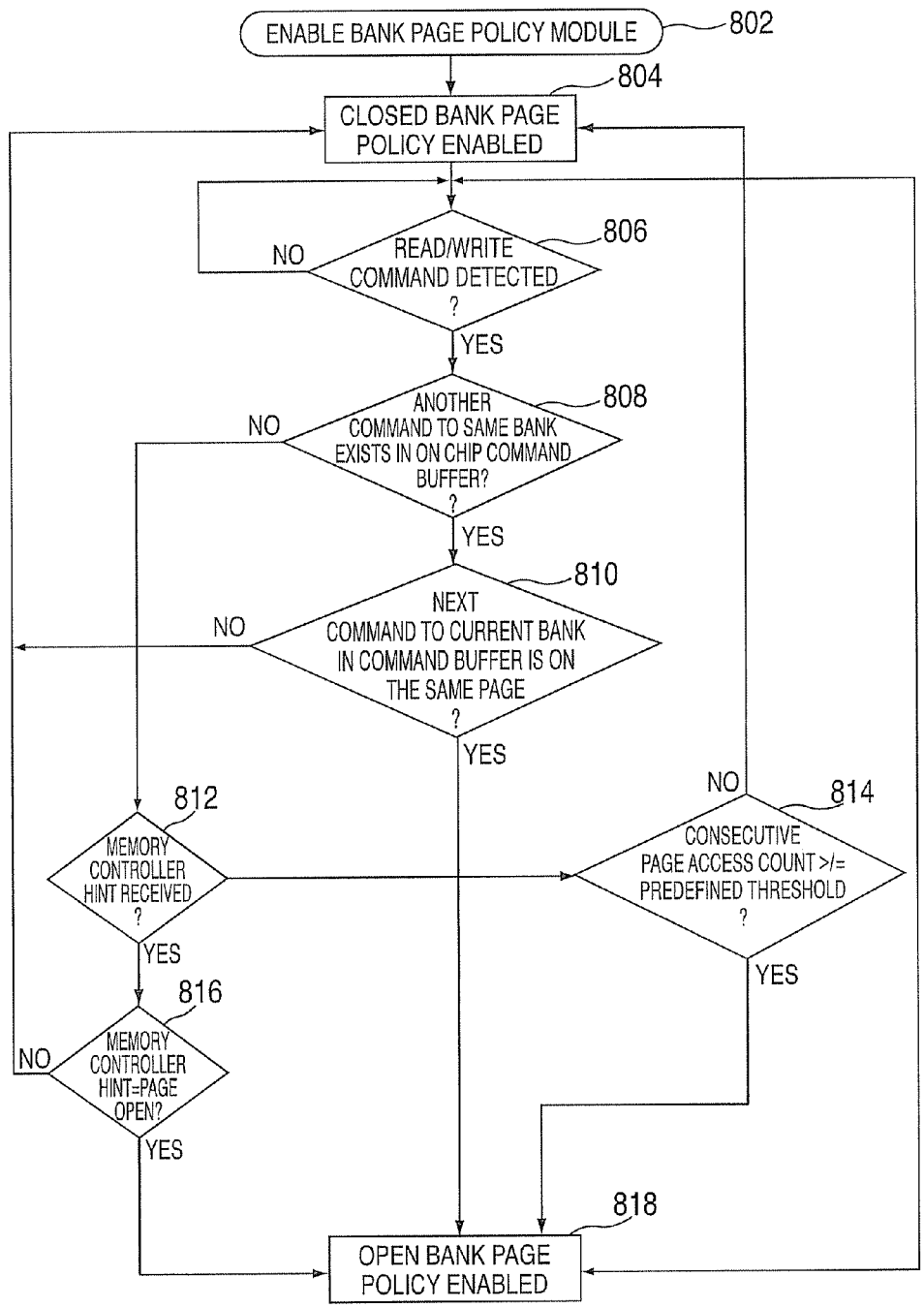
FIG. 8 depicts a process flow that may be implemented by exemplary embodiments.

Each of these methods can be implemented without the other, or one or more may be coupled together as outlined in FIG. 8. FIG. 8 depicts a process flow that may be implemented by the bank page policy module 702 in exemplary embodiments. At block 802, the bank page policy module 702 is enabled. In exemplary embodiments, the bank page policy module processing described herein is implemented by one or more BOCLUs (e.g, one per memory bank). At block 804, the bank page policy is defaulted to a closed page policy mode. Block 806 monitors a command input stream to the memory hub device 704 (e.g., via the input command stream interface 706) to detect read and write commands to memory devices 509 attached to the memory hub device 704. Block 806 continues to monitor the input stream until a read or write command is detected. When a read or write command is detected blocks 806-818 are performed to analyze the command to determine access patterns to the memory devices 509. Based on the analysis, block 804 and/or block 818 is performed to dynamically select between an open bank policy and a closed bank page policy.

When a read or write command is detected at block 806, processing continues at block 808 to determine if another command to the same bank exists (or is being received) in the command register in the memory hub control 713. If another command to the same bank does exist, as determined at block 808, then block 810 is performed to determine if the other command to the current bank will be to the same page. If it is, then block 818 is performed and the bank policy is switched to an open bank policy, and the bank is left open upon completion of the first access. If the other command is to the same bank but does not access the same page, then the closed bank policy is retained, and the bank is closed upon completion of the current access. Processing then continues at block 804 with the closed bank policy being enabled.

If, at block 808, it is determined that another command to the same bank has not been received and/or does not exist in the hub command buffer, then a check is made at block 812 to determine if the memory controller 510 sent a hint to leave the page open or closed. If no hint was received, as determined at block 812, then block 814 is performed to utilize the current command and previous commands to determine a value for the bank page policy. A check is made at block 814 to determine if the consecutive page access count in the corresponding BOCLU is greater than or equal to a predefined threshold (e.g., 2, 4, 6). The predefined threshold may vary between BOCLUs and may be adjusted dynamically during memory subsystem operation. If the consecutive page access count is greater than or equal to the predefined threshold, then block 818 is performed and the bank page policy is switched to a bank open page policy. Processing then continues at block 806 to monitor the input command stream. If the consecutive page access count is not greater than or equal to the predefined threshold, as determined at block 814, then processing continues at block 804 with the policy continuing to be a bank closed policy. If a hint was received at block 812, then processing would continue to block 816. At block 816 a check of the memory controller hint is performed. If the hint from the memory controller requires that the page must be opened, then processing continues to block 818. If the hint requires that the page must be closed, then processing continues to block 804.

Those skilled in the art can see that the same process can be applied to a default 'open page' policy.

Figure 9:
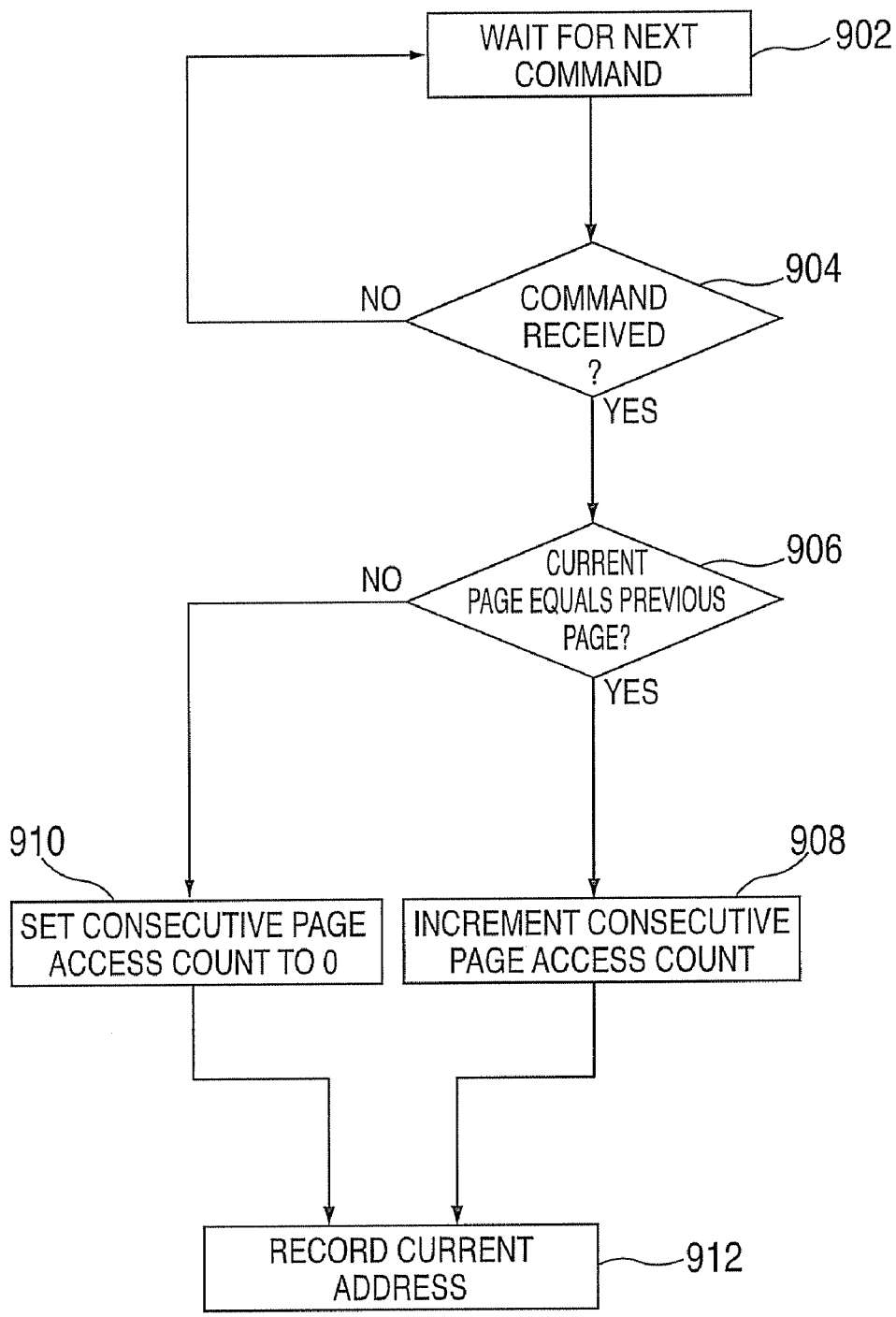
FIG. 9 depicts a process flow for calculating a consecutive page access count that may be implemented by exemplary embodiments.

FIG. 9 depicts an exemplary process for calculating the consecutive page access count that is utilized at block 814 in FIG. 8 to determine if there is an access pattern of consecutive pages being accessed by commands in the input command stream. At block 902, the BOCLU waits for the next command. A check is made at block 904 to determine if a new command has been detected. When a new memory access (e.g. read or write) command is detected by the BOCLU, then block 906 is performed and the address (including the row (page) address) of the new access is compared to the current address (including the row address) to determine if they are equal. If the same page in memory is being accessed, then block 908 is performed and the consecutive page access count is incremented. Processing continues at block 912. If the two addresses are not equal, then block 910 is performed and the consecutive page access count is reset to zero. In alternate exemplary embodiments, the count is reset to one, is decremented, or is set to any other number. Processing continues at block 912. At block 912, the current address is recorded and processing continues at block 902 to wait for receipt of the next memory command.

Figure 10:
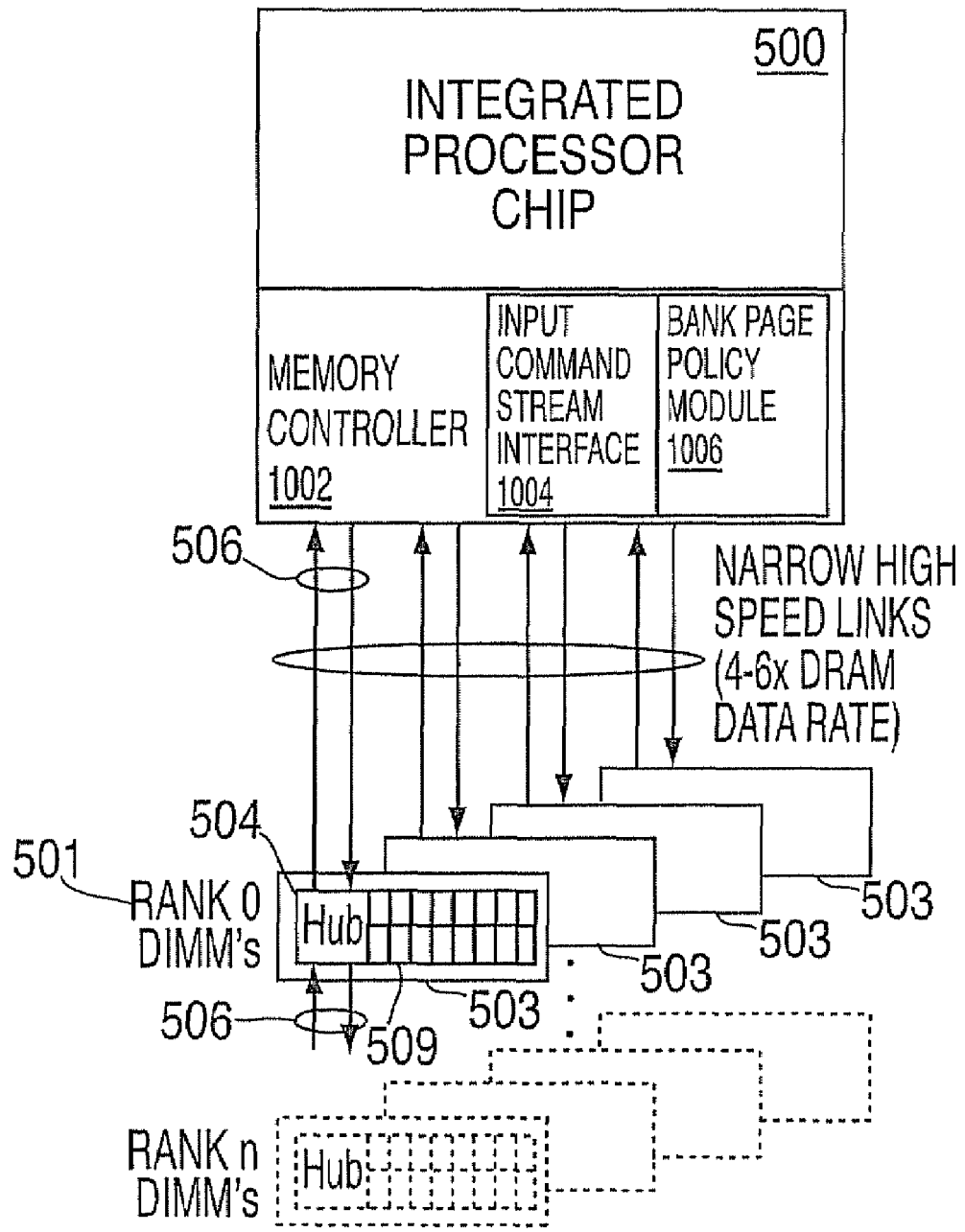
FIG. 10 depicts a block diagram of system for implementing exemplary embodiments.

In other exemplary embodiments, such as the one depicted in FIG. 10, the functions described herein are implemented in a memory controller 1002 and the setting of the bank page policy is dynamic based on the algorithms used in the memory controller 1002, and the memory controller 1002 modifies the hub operation mode by means of either commands sent to the hub over the memory bus 506, or by means of a second (lower speed) bus such as an SMBus, and I2C bus or another bus that permits communication between the memory controller 1002 and/or the integrated processor and the hub device(s) 504. FIG. 10 depicts a memory controller 1002 for receiving and responding to memory access requests. The memory controller 1002 includes an input command stream interface 1004 for detecting commands directed to selected memory devices 509. The memory controller 1002 also includes a bank page policy module 1006 for independently analyzing the commands to determine access patterns to the selected memory devices 509 and for dynamically selecting between an open bank page policy and a closed bank page policy for the selected memory devices 509 based on the analysis.

Exemplary embodiments include a computing system with a processor(s) and an I/O unit(s) (e.g., requesters) interconnected to a memory system that contains a memory controller and memory devices. In exemplary embodiments, the memory system includes a processor or memory controller interfaced to a set of hub devices (also referred to as "hub chips"). The hub devices connect and interface to the memory devices. In exemplary embodiments the computer memory system includes a physical memory array with a plurality of memory devices for storing data and instructions. These memory devices may be connected directly to the memory controller and/or indirectly coupled to the memory controller through hub devices. In exemplary embodiments, the hub-based computer memory system has memory devices attached to a communication hub device that is connected to a memory control device (e.g., a memory controller). Also in exemplary embodiments, the hub device is located on a memory module (e.g, a single substrate or physical device) that includes two or more hub devices that are cascaded interconnected to each other (and possibly to another hub device located on another memory module) via the memory bus.

Hub devices may be connected to the memory controller through a multi-drop or point-to-point bus structure (which may further include a cascade connected to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. In exemplary embodiments, the downstream memory bus connects a memory controller to a hub device, or connects a hub device to another hub device further away from the memory controller. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options. In exemplary embodiments, the downstream bus has a protocol that is used to control the memory system.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options. In exemplary embodiments, the upstream bus has a protocol that is used to receive responses from the memory system.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the FIGs., the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller(s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it at another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices.

Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while malting use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Emerging high performance systems are adapting new bus structures to address some of the system cost and memory density concerns, including the use of cascade-interconnected memory subsystems that include one or more hub device(s) on a memory module. With the inclusion of the hub device(s), which can act upon command, data and address information intended for the memory devices, new solutions to maximize overall system performance can be considered. Technical effects of exemplary embodiments include reducing overall memory system latency, thereby improving system performance. In exemplary embodiments, the specific areas of improvement relate to a maximization of the utilization of the memory bus(ses) between the memory controller and the memory subsystem(s), as well as a reduction in the overall read access latency from the memory subsystem(s).

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A hub device comprising:
   an input command stream interface for detecting commands from a memory controller directed to one or more memory devices that are connected to the hub device; and
   a bank page policy module for independently analyzing the commands to determine access patterns to the memory devices and for dynamically selecting between an open bank page policy and a closed bank page policy for the memory devices based on the analysis.

2. The hub device of claim 1 wherein the access patterns are read access patterns.

3. The hub device of claim 1 wherein the analyzing and selecting applies to one bank on one of the memory devices.

4. The hub device of claim 1 wherein the analyzing and selecting is applied to one of the memory devices is independent of the analyzing and selecting applied to an other of the memory devices.

5. The hub device of claim 1 wherein the analyzing and selecting is applied to one bank in one of the memory devices is independent of the analyzing and selecting applied to an other bank in the memory device.

6. The hub device of claim 1 wherein the analyzing and selecting applies to all of the memory devices.

7. The hub device of claim 1 wherein the commands include pending future commands located in a memory command buffer.

8. The hub device of claim 7 wherein the bank page policy module further reorders the pending further commands in the memory command buffer to alter future access patterns.

9. The hub device of claim 1 wherein the analyzing includes using a consecutive page access counter to select between the open bank page policy and the closed bank page policy.

10. A method for selecting a bank page policy, the method comprising:
   detecting commands from a memory controller directed to one or more memory devices, the detecting at a hub device connected to the one or more memory devices;
   independently analyzing the commands to determine access patterns to the memory devices, the analyzing performed at the hub device; and
   dynamically selecting between an open bank page policy and a closed bank page policy for the memory devices based on the analysis, the selecting performed at the hub device.

11. The method of claim 10 further comprising selecting the closed bank page policy for the memory devices before detecting the commands.

12. The method of claim 10 further comprising selecting the open bank page policy for the memory devices before detecting the commands.

13. The method of claim 10 further comprising accessing a memory command buffer of pending future commands, wherein the pending future commands are input to the analyzing.

14. The method of claim 13 further comprising reordering the pending future commands in the memory command buffer to alter future access patterns.

15. The method of claim 10 wherein the analyzing includes selecting the open bank page policy for the memory devices if a consecutive page access count is higher than or equal to a threshold.

16. The method of claim 10 wherein the access patterns are read access patterns.

17. The method of claim 10 wherein the analyzing and selecting applies to one bank on one of the memory devices.

18. The method of claim 10 wherein the analyzing and selecting applied to one of the memory devices is independent of the analyzing and selecting applied to an other of the memory devices.

19. The method of claim 10 wherein the analyzing and selecting applied to one bank in one of the memory devices is independent of the analyzing and selecting applied to an other bank in the memory device.

20. The method of claim 10 wherein the analyzing and selecting applies to all of the memory devices.

21. The method of claim 10 wherein the detecting, selecting and analyzing are performed at a hub device.

22. A memory system comprising:
   a memory controller;
   one or more memory devices; and
   a memory hub device in communication with the memory controller and the memory devices, the memory hub device comprising:
      an input command stream interface for detecting commands from the memory controller directed to the memory devices; and
      a bank page policy module for independently analyzing the commands to determine access patterns to the memory devices and for dynamically selecting between an open bank page policy and a closed bank page policy for the memory devices based on the analysis.

23. The memory system of claim 22 wherein the analyzing and selecting applies to one bank on one of the memory devices.

24. The memory system of claim 22 wherein the analyzing and selecting applied to one of the memory devices is independent of the analyzing and selecting applied to an other of the memory devices.

25. The memory system of claim 22 wherein the analyzing and selecting applied to one bank in one of the memory devices is independent of the analyzing and selecting applied to an other bank in the memory device.

26. The memory system of claim 22 wherein the analyzing and selecting applies to all of the memory devices.

27. A memory subsystem comprising:
   a plurality of memory devices; and
   a memory hub device comprising:
      an input command stream interface for detecting commands from a memory controller directed to the memory devices; and
      a bank page policy module for independently analyzing the commands to determine access patterns to the memory devices and for dynamically selecting between an open bank page policy and a closed bank page policy for the memory devices based on the analysis.

28. The memory subsystem of claim 27 wherein the analyzing and selecting applies to one bank on one of the memory devices.

29. The memory subsystem of claim 27 wherein the analyzing and selecting applied to one of the memory devices is independent of the analyzing and selecting applied to an other of the memory devices.

30. The memory subsystem of claim 27 wherein the analyzing and selecting applied to one bank in one of the memory devices is independent of the analyzing and selecting applied to an other bank in the memory device.

31. The memory subsystem of claim 27 wherein the analyzing and selecting applies to all of the memory devices.

* * * * *